United States Patent Office 3,272,799
Patented Sept. 13, 1966

3,272,799
11,19-SUBSTITUTED PROGESTERONES
Kenneth G. Holden, Haddon Heights, N.J., and James F. Kerwin, Broomall, Pa., assignors to Smith Kline & French Laboratories, Philadelphia, Pa., a corporation of Pennsylvania
No Drawing. Filed Oct. 25, 1962, Ser. No. 233,137
6 Claims. (Cl. 260—239.55)

This invention relates to 11,19-substituted progesterones including compounds having utility as intermediates and products useful as hormonal like agents. More specifically the products of this invention have progestational, anti-inflammatory, anti-androgenic and cholesterol lowering activity.

The 11,19-substituted progesterone products of this invention may be described as 11,19-hemiacetal, -lactone, -oxido and -dihydroxy derivatives and are represented by the following structural formulas:

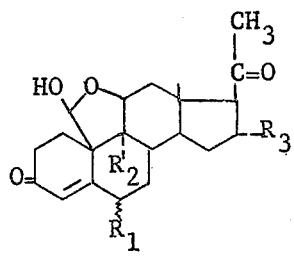

I

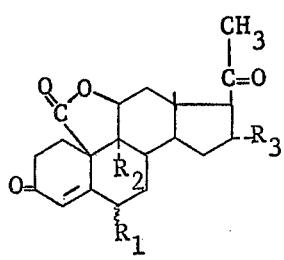

II

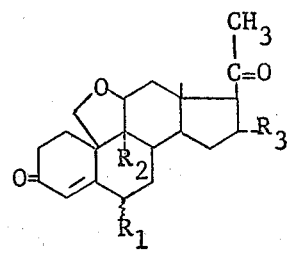

III

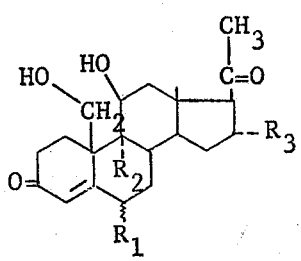

IV in which:

$R_1$ represents hydrogen, methyl or fluoro;
$R_2$ represents hydrogen or fluoro;
$R_3$ represents hydrogen or methyl; and
$\xi$ is either $\alpha$ or $\beta$.

The preparation of the compounds of Formulas I–IV and others of this invention is represented most conveniently by the following reaction scheme in which the representations for $R_1$, $R_2$, $R_3$ and $\xi$ are the same as that given above for Formulas I–IV:

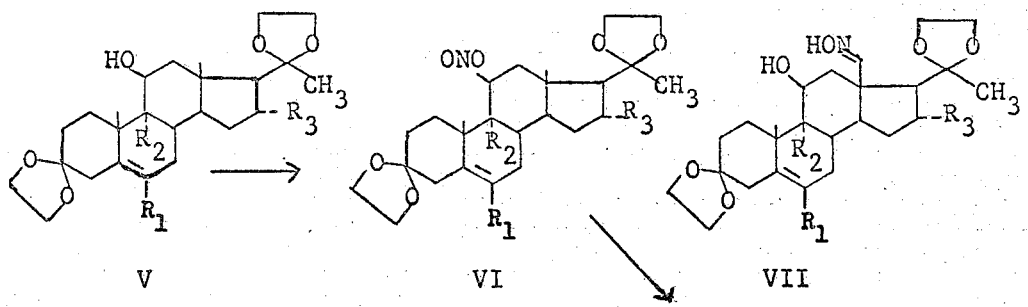

V                    VI                    VII

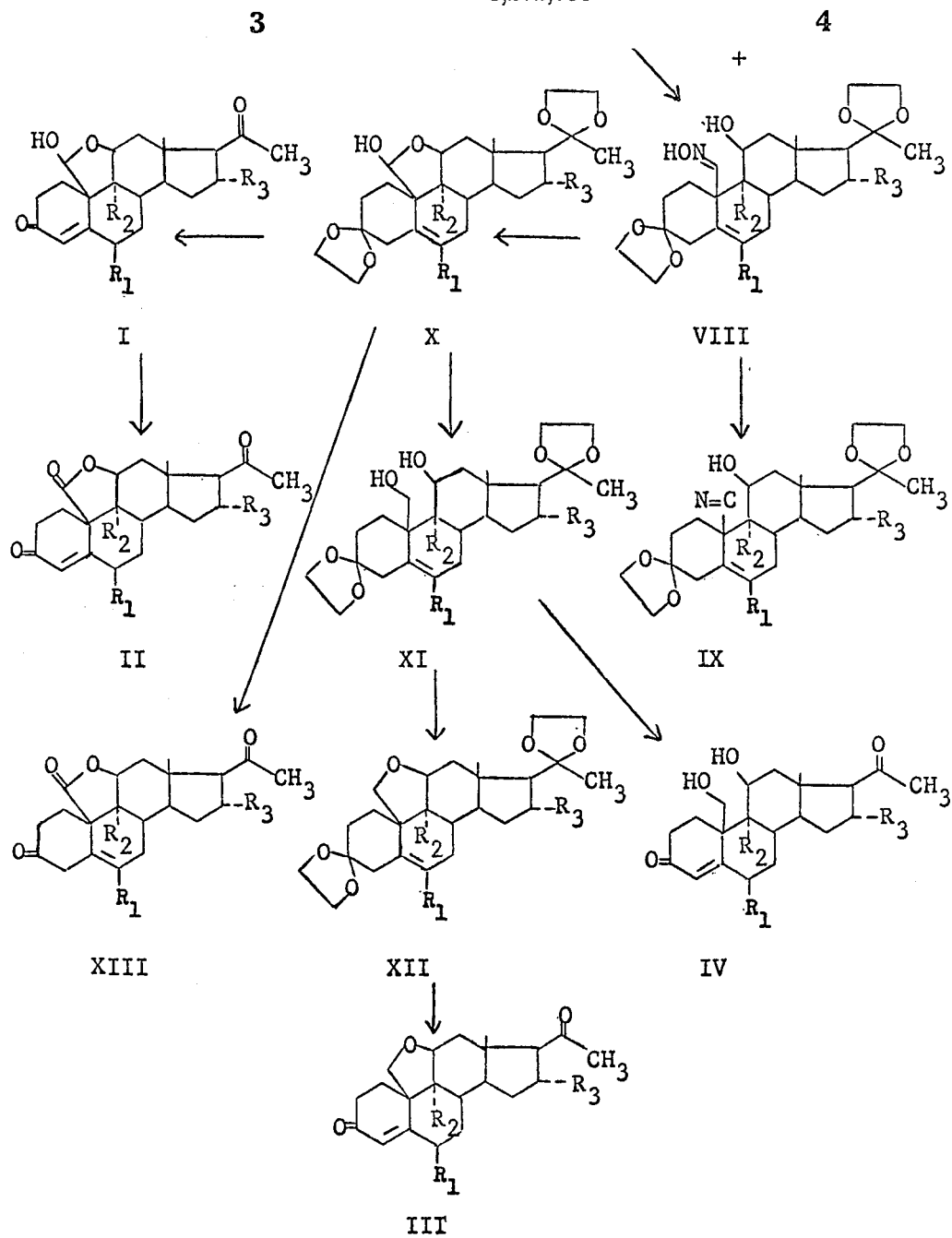

As shown above, an 11β-hydroxypregn-5-ene-3,20-dione 3,20-bisethyleneketal of Formula V (prepared from a pregn-5-ene-3,11,20-trione 3,20-bisethyleneketal by reduction with lithium aluminum hydride) is treated with nitrosyl chloride to give the corresponding 11-nitrite ester of Formula VI. Advantageously this reaction is carried out in the presence of a basic organic solvent, for example pyridine, at reduced temperatures, about 0° C. The 11-nitrite ester, dissolved in an unreactive organic solvent, for example toluene, is irradiated with a Hanovia high pressure mercury arc lamp under an atmosphere of purified nitrogen. Evaporation of the solvent gives a residual mixture of 18- and 19-oxime derivatives which are separated by fractional recrystallization (Formulas VII and VIII).

The 19-oxime (VIII) is added to a mixture of glacial acetic acid and 5% aqueous sodium nitrite solution at 0–10° C. to yield upon workup the 11,19-hemiacetal 3,20-bisethyleneketal of Formula X. The free 11,19-hemiacetal (Formula I) is obtained from X by boiling in aqueous acetone containing concentrated sulfuric acid for several hours.

Oxidation of X with chromic acid solution followed by hydrolysis of the ethyleneketal groups gives the 3,20-dioxo-11β-hydroxypregn-5-en-19-oic acid 11,19-lactone of Formula XIII which has hormonal activity similar to the lactone of Formula II as described above.

Oxidation of the free 11,19-hemiacetal (Formula I) with chromic acid solution yields the 3,20-dioxo-11β-hydroxypregn-4-en-19-oic acid 11,19-lactone of Formula II.

The 19-oxime (VIII) dissolved in acetic anhydride and pyridine is heated at approximately 100° C. for about one hour to give upon workup the 19-nitrile of Formula IX. Hydrolysis of the latter with 50% aqueous acetic acid gives a mixture of lactones II and XIII.

Reduction of X with lithium aluminum hydride gives the 11,19-diol of Formula XI which is hydrolyzed to the free 11,19-dihydroxyprogesterone of Formula IV by heating in 50% aqueous acetic acid solution. Treatment of the 11,19-diol XI with p-toluenesulfonyl chloride in pyridine at room temperature for about 24 hours results in the formation of the 11β,19-oxidopregn-5-ene-3,20-dione 3,20-bisethyleneketal of Formula XII. Hydrolysis of the latter by refluxing with concentrated sulfuric acid in aqueous acetone yields the 11β,19-oxidoprogesterone of Formula III.

It is readily apparent from the above disclosure that the 11,19-substituted progesterones of this invention are readily prepared from available 11β-hydroxyprogesterone starting materials. The compounds set forth above not specified as products, for example the 19-oxime (VIII), its free 3,20-dioxo derivative and the 19-nitrile (IX) have of course particular utility as intermediates to prepare the products.

The following examples illustrate the preparative procedures outlined above and will make fully apparent the utility of various compounds as intermediates for the preparation of the hormonal agents of Formulas I–IV and XIII having progestational, anti-inflammatory, anti-androgenic and cholesterol lowering activity. It is to be noted that the corresponding 3,20-bisethyleneketal derivatives described herein are similarly useful as hormonal agents as are the free 3,20-dioxo products.

*Example 1*

A solution of 27.8 g. of 11β-hydroxypregn-5-ene-3,20-dione 3,20-bisethyleneketal in 100 ml. of pyridine is treated with excess nitrosyl chloride at 0° C. The reaction is poured into ice-water and extracted with ether. The organic extracts are washed with cold dilute phosphoric acid and cold dilute sodium bicarbonate solution, combined, dried, and evaporated to give a residue which is immediately recrystallized from methanol to yield 11β-hydroxypregn-5-ene-3,20-dione, 3,20-bisethyleneketal 11-nitrite ester, M.P. 129–131° C.

A solution of 3.7 g. of 11β-hydroxypregn-5-ene-3,20-dione, 3,20-bisethyleneketal 11-nitrite ester in 150 ml. of dry, redistilled toluene is irradiated with a Hanovia high pressure mercury arc lamp. Th irradiation is carried out using a water cooled pyrex immersion well and magnetic stirring under an atmosphere of purified nitrogen. After evaporation of the toluene under reduced pressure the residue is taken up in ether. The resulting precipitate is filtered off to give 11β-hydroxy-3,18,20-trioxopregn-5-ene 3,20-bisethyleneketal 18-oxime which, after recrystallization from acetone, melts at 255–257° C. Cooling of the filtrate gives 11β-hydroxy-3,19,20-trioxopregn-5-ene 3,20-bisethyleneketal 19-oxime which melts at 201–204° C. after recrystallization from tetrahydrofuran-ether.

A solution of 1.0 g. of 11β-hydroxy-3,19,20-trioxopregn-5-ene 3,20-bisethyleneketal 19-oxime in 50 ml. of 50% aqueous acetic acid is heated at 100° C. for 15 minutes. After cooling and dilution with water the precipitate of 11β-hydroxy-3,19,20-trioxopregn-4-ene 19-oxime is collected by filtration.

To a stirred mixture of glacial acetic acid (200 ml.) and 5% aqueous sodium nitrite solution (100 ml.) at 0–10° C. is added 9.0 g. of finely powdered 11β-hydroxy-3,19,20-trioxopregn-5-ene 3,20-disethyleneketal 19-oxime. After ten minutes ten ml. of methylene chloride is added and stirring is continued for an additional minute. The reaction mixture is poured into 1.5 l. of ice-water and extracted with methylene chloride. After washing with 5% sodium carbonate solution the combined organic extracts are dried and evaporated to a crystalline residue which on recrystallization from acetone gives 11β-hydroxy-3,19,20-trioxopregn-5-ene 3,20-bisethyleneketal 11,19-hemiacetal, M.P. 238–245° C.

A solution of 5.6 g. of 11β-hydroxy-3,19,20-trioxopregn-5-ene 3,20-bisethyleneketal 11,19-hemiacetal in acetone (100 ml.) containing ten ml. of water and ten drops of concentrated sulfuric acid is boiled for three hours and then evaporated almost to dryness under reduced pressure. The residue is taken up in methylene chloride and washed with sodium carbonate solution. Evaporation of the combined and dried extracts gives a residue which is recrystallized from acetone to give 11β-hydroxy-3,19,20-trioxopregn-4-ene 11,19-hemiacetal, M.P. 237–239° C., $[\alpha]_D^{25}$ +252°; ultraviolet absorption: λmax 2477 mμ ($\epsilon$, 13,800).

*Example 2*

A solution of 2.0 g. of 11β-hydroxy-3,19,20-trioxopregn-5-ene 3,20-bisethyleneketal 11,19-hemiacetal (prepared as in Example 1) in 50 ml. of acetone is oxidized with a slight excess of 2.7 M chromic acid. Dilution with water and extraction with methylene chloride followed by drying and evaporation of the organic extracts gives an oily residue which is taken up in 25 ml. of acetone containing one ml. of water and three drops of concentrated sulfuric acid. After refluxing for one hour the mixture is cooled and filtered to give 3,20-dioxo-11β-hydroxypregn-5-ene-19-oic acid 11,19-lactone, M.P. 257–263° C., $[\alpha]_D^{25}$ +74.7°; ultraviolet absorption: λmax 237 mμ ($\epsilon$, 1,800).

*Example 3*

A mixture of 0.50 g. of 11β-hydroxy-3,19,20-trioxopregn-4-ene 11,19-hemiacetal (prepared as in Example 1) and acetone (50 ml.) is treated with an excess of 2.7 M chromic acid. The reaction mixture is diluted with water and extracted with methylene chloride. Drying and evaporation of the organic extracts produce a crystalline residue which is recrystallized from acetone to give 3,20-dioxo-11β-hydroxypregn-4-ene-19-oic acid 11,19-lactone, M.P. 237–239° C., $[\alpha]_D^{25}$+270°; ultraviolet absorption: λmax 241 mμ ($\epsilon$, 13,100).

*Example 4*

A solution of 1.0 g. of 11β-hydroxy-3,19,20-trioxopregn-5-ene 3,20-bisethyleneketal 19-oxime (prepared as in Example 1) in acetic anhydride (7 ml.) and pyridine (7 ml.) is heated for 45 minutes at 100° C. The warm reaction mixture is poured into ice-water and extracted with methylene chloride. After washing with dilute phosphoric acid and sodium carbonate solutions the organic phases are combined, dried, and evaporated to an oil. Crystallization from ether followed by recrystallization from acetone-hexane gives 3,20-dioxo-11β-hydroxypregn-5-ene-19-nitrile, 3,20-bisethyleneketal, M.P. 172–175° C. Hydrolysis of this material with hot 50% aqueous acetic acid gives a mixture of the 3,20-dioxo-11β-hydroxypregn-4- and -5-ene-19-oic acid 11,19-lactones of Examples 2 and 3.

*Example 5*

To a stirred mixture of 2.0 g. of lithium aluminum hydride and 75 ml. of tetrahydrofuran is added, in portions, 4.0 g. of 11β-hydroxy-3,19,20-trioxopregn-5-ene 3,20-bisethyleneketal 11,19-hemiacetal (prepared as in Example 1). After stirring for 20 hours the reaction mixture is treated with eight ml. of water and the precipitated hydroxides are filtered and washed with tetrahydrofuran. The combined filtrates are evaporated to a crystalline solid which is recrystallized from acetone to give 11β,19-dihydroxypregn-5-ene-3,20-dione 3,20 - bisethyleneketal, M.P. 207–211° C.

A solution of 250 mg. of 11β,19-dihydroxypregn-5-ene-3,20-dione 3,20-bisethyleneketal in four ml. of 50% aqueous acetic acid is heated under nitrogen at 100° C. for 15 minutes. The cooled solution is diluted with water and filtered to give 150 mg. of 11β,19-dihydroxyprogesterone which, after recrystallization from acetone melts at 175–178° C., $[\alpha]_D^{25}$ +208°; ultraviolet absorption: λmax 244 mμ ($\epsilon$, 14,300).

*Example 6*

A solution of 3.0 g. of 11β,19-dihydroxypregn-5-ene-3,20-dione 3,20-bisethyleneketal (prepared as in Example 5) in ten ml. of dry pyridine is treated with 1.5 g. of p- toluene-sulfonyl chloride. After standing at room temperature for 24 hours the mixture is diluted with 100 ml. of water, cooled and filtered to give a damp solid which is recrystallized from acetone to yield 11β,19-oxidopregn-5-ene-3,20-dione 3,20-bisethyleneketal, M.P. 185–187° C.

A solution of 700 mg. of 11β,19-oxidopregn-5-ene-3,20-dione 3,20-bisethyleneketal in 20 ml. of acetone containing two ml. of water and three drops of concentrated sulfuric acid is refluxed for three hours. The warm solution is poured into a dilute sodium carbonate solution and extracted with methylene chloride. Drying and evaporation of the combined organic phases gives a crystalline residue which on recrystallization from acetone-hexane affords 11β,19-oxidoprogesterone, M.P. 173–177° C., $[\alpha]_D^{25}$ +202°; ultraviolet absorption: λmax 243 mμ (ε, 15,400).

*Example 7*

Similarly, the 3,20-bisethyleneketal derivatives of the following 11β-hydroxyprogesterones are converted according to the procedures of Examples 1 through 6, to the 11-nitrite esters, the 19-oximes and thence to the corresponding 11,19-hemiacetal, 11,19-lactone, 11β,19-dihydroxy, 19-nitrile and 11β,19-oxido derivatives:

6α-methyl-11β-hydroxyprogesterone
6α-fluoro-11β-hydroxyprogesterone
6β-fluoro-11β-hydroxyprogesterone
9α-fluoro-11β-hydroxyprogesterone
6α,9α-difluoro-11β-hydroxyprogesterone
6β,9α-difluoro-11β-hydroxyprogresterone
9α-fluoro-16α-methyl-11β-hydroxyprogesterone
6α-methyl-9α-fluoro-11β-hydroxyprogesterone

We claim:

1. A chemical compound of the formula:

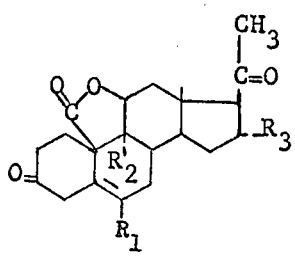

in which:
R₁ is a member selected from the group consisting of hydrogen, methyl and fluoro;
R₂ is a member selected from the group consisting of hydrogen and fluoro; and
R₃ is a member selected from the group consisting of hydrogen and methyl.

2. 3,20-dioxo-11β-hydroxypregn-5-ene-19-oic acid 11,19-lactone.

3. A compound selected from the group consisting of a compound of the formula:

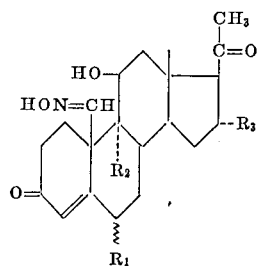

in which:
ξ is a configurational position selected from the group consisting of α and β;
R₁ is a member selected from the group consisting of hydrogen, methyl and fluoro;
R₂ is a member selected from the group consisting of hydrogen and fluoro; and
R₃ is a member selected from the group consisting of hydrogen and methyl.

4. 11β-hydroxy-19-oxoprogesterone 19-oxime.

5. A chemical compound of the formula:

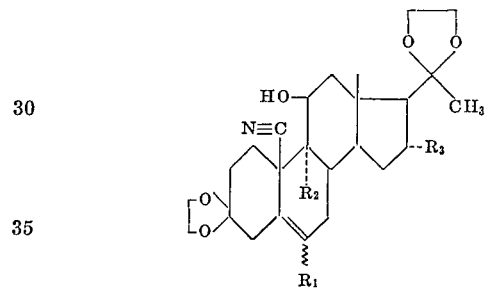

in which:
R₁ is a member selected from the group consisting of hydrogen, methyl and fluoro;
R₂ is a member selected from the group consisting of hydrogen and fluoro; and
R₃ is a member selected from the group consisting of hydrogen and methyl.

6. 3,20-dioxo-11β-hydroxypregn-5-ene-19-nitrile 3,20-bisethyleneketal.

References Cited by the Examiner

UNITED STATES PATENTS 3,040,038  6/1962  Shull _____ 260—397.45

OTHER REFERENCES

Barton et al.: J. Amer. Chem. Society, vol. 83, Oct. 5, 1961, pp. 4076–4083.
Heller et al.: Helv. Chim. Acta, vol. XLV, June 15, 1962, pp. 1261–1274.
Heusler et al.: Helv. Chim. Acta, vol. 46, Feb. 1, 1963, pp. 352–364.

LEWIS GOTTS, *Primary Examiner.*

J. R. GENTRY, J. R. BROWN, *Assistant Examiners.*